BEST AVAILABLE COPY

J. W. SAYRE & A. S. SHULL.

Machines for Dressing the Edges of Slate-Frames.

No. 5,322. Reissued March 11, 1873.

WITNESSES. Harry Smith
John K Kupertus

John W. Sayre and
Henry M. Harper
by their Attys.
Howson & Sons.

AM. PHOTO-LITHOGRAPHIC CO. N.Y. (OSBORNE'S PROCESS)

UNITED STATES PATENT OFFICE.

JOHN W. SAYRE AND ALEXANDER S. SHULL, OF MARTIN'S CREEK, PENNSYLVANIA; SAID SAYRE ASSIGNOR OF ONE-THIRD, AND SAID SHULL ASSIGNOR OF ALL, HIS INTEREST TO HENRY W. HARPER.

IMPROVEMENT IN MACHINES FOR DRESSING THE EDGES OF SLATE-FRAMES.

Specification forming part of Letters Patent No. 50,170, dated September 26, 1865; reissue No. 5,322, dated March 11, 1873.

*To all whom it may concern:*

Be it known that JOHN W. SAYRE and ALEXANDER S. SHULL, of Martin's Creek, county of Northampton, State of Pennsylvania, have invented certain Improvements in Machines for Dressing the Edges of Slate-Frames, of which the following is a specification:

The object of this invention is to rapidly round and dress the corners and edges of slate-frames; and the inventors attain this object by means of a frame, which is arranged to receive the slate, and which is moved in a curved path, while a rotary cutter acts on the corner of the slate-frame, to which corner the desired rounded shape is consequently imparted.

We will now proceed to describe the mode employed by the inventors of carrying their invention into effect, reference being had to the accompanying drawing, in which—

Figure 1:
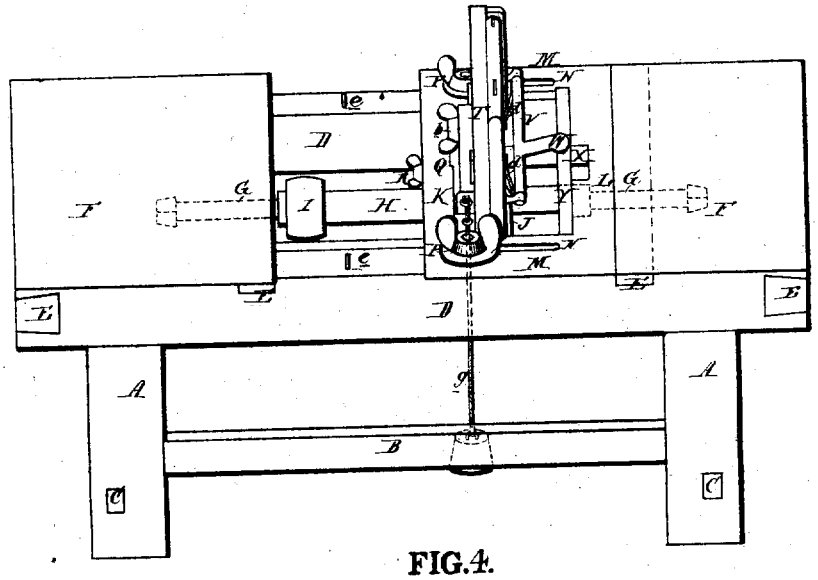
Figure 4:
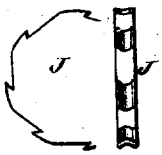
Figure 2:
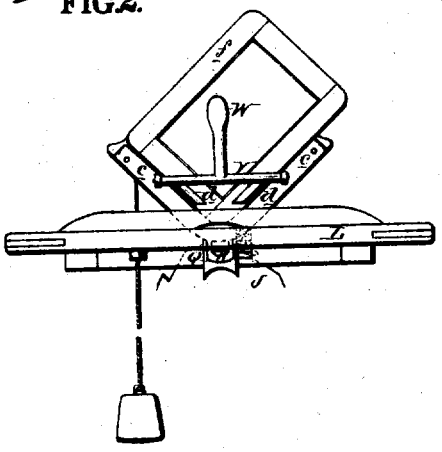
Figure 3:
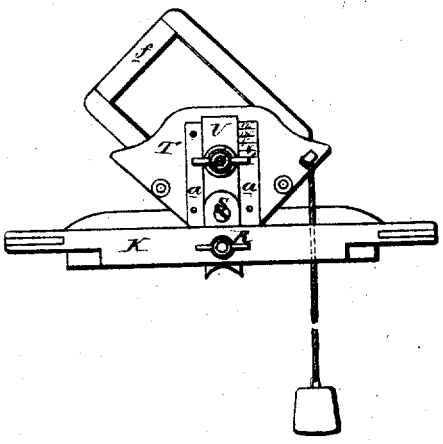

Figure 1 is a view of the machine tilted so as to exhibit the top in an inclined position; Figs. 2 and 3, views illustrating opposite sides of the rocking or vibrating frame; and Fig. 4 represents a side and edge view of the rotary cutter.

The frame of the machine consists of posts A A, connected together by the bars B and C C, and supporting the rails D D, which are connected by the cross-bars E E, partially shown in Fig. 1.

A portion of this frame at each end is covered by the boards F F, which form convenient tables for receiving piles of framed slates.

Through the intermediate cross-bars E E of the frame pass horizontal screws G G, shown by the dotted lines in Fig. 1, and on the points of these screws revolves the shaft H, to which is secured a pulley, I, for receiving a driving-belt and a cutter-wheel, J, the latter being made concave on its edge, so as to impart the desired lateral rounding to the edges of the slate-frame. (See Fig. 4.)

An adjustable frame, composed of bars K and L, and ends M M, is secured to the permanent frame of the machine by bolts passing through elongated slots in said adjustable frame. A stand, Q, is secured to the bar K of the adjustable frame by means of a bolt, R, (Fig. 3,) this stand being connected by a pivot, S, to a slide, U, so secured by a bolt, *b*, to the back of the rocking frame T between guiding-strips *a a* on the same, that the said rocking frame can be adjusted on the slide at pleasure and secured after adjustment. On the opposite side of the rocking frame are strips *c c*, to which the slate-frame *f* is adjusted, as shown in Fig. 2, after which, and while the cutter J is rapidly revolving, the rocking frame is moved on its pivot S′, and consequently traverses a curved path; the result of which is the rounding of the corner of the slate-frame by the cutter.

The slate is retained in its place by means of a clamp, which consists of a spindle, V, adapted to bearings in the rocking frame, and having two arms, *d d*, which are forced against the slate *f* by manipulating the longer arm W while the frame is being operated. After the rocking frame has been thus moved in a curved path from left to right, (Fig. 2,) and one corner of the slate-frame has been rounded during this movement, the frame is restored to its original position by a weight, as shown, and the slate may then be readjusted to the rocking frame and another corner rounded, and so on until all four corners have been rounded, when another slate may be operated on in a similar manner. After the corners of a number of slate-frames have been thus rounded the nuts of the bolts P may be loosened and the adjustable frame moved to the left, against the pins *e e*, and the bolts tightened. This will bring the bar L of the adjustable frame over the cutter J, which will revolve in an opening, X, in the said bar, the latter being provided with a guide, Y, against which the sides of the slate-frame bear as the latter is pushed over the cutter to round the straight edges of the said slate-frame to correspond with the rounded corners of the same.

We claim as the invention of the said SAYRE and SHULL—

1. The combination, with a rotating cutter, J, of the frame T, which is arranged to receive a slate-frame, and which admits of being moved in a curved path, all substantially as set forth.

2. The said frame T, in combination with the clamp V or its equivalent.

In testimony whereof we have signed o names to this specification in the presence two subscribing witnesses.

JNO. W. SAYRE.
HENRY W. HARPER.

Witnesses:
A. W. LERCH,
S. T. COFFIN.